(12) United States Patent
Sakata

(10) Patent No.: US 10,875,268 B2
(45) Date of Patent: Dec. 29, 2020

(54) TRANSPORT SYSTEM

(71) Applicant: Murata Machinery, Ltd., Kyoto (JP)

(72) Inventor: Hideji Sakata, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 0 days.

(21) Appl. No.: 16/382,010

(22) Filed: Apr. 11, 2019

(65) Prior Publication Data
US 2019/0337248 A1   Nov. 7, 2019

(30) Foreign Application Priority Data

May 2, 2018 (JP) ................................ 2018-088794

(51) Int. Cl.
*B29D 30/00* (2006.01)
*B66C 13/06* (2006.01)

(52) U.S. Cl.
CPC .......... *B29D 30/0016* (2013.01); *B66C 13/06* (2013.01); *B29D 2030/0022* (2013.01)

(58) Field of Classification Search
CPC ........ B29D 30/0016; B29D 2030/0022; B65G 2201/0297; B66C 13/06; B66C 13/08; H01L 21/6773; H01L 21/67773; H01L 21/67733; Y10S 414/14
USPC ................................................. 414/626, 940
See application file for complete search history.

(56) References Cited

U.S. PATENT DOCUMENTS

| 5,306,109 A  * | 4/1994 | Kreuzer ............... F16M 11/041 414/343 |
| 8,104,729 B2 * | 1/2012 | Walke .................. A61G 12/002 248/125.1 |
| 9,096,387 B2 * | 8/2015 | Liu ....................... B65G 69/003 |

FOREIGN PATENT DOCUMENTS

| JP | 3-80084 U | 8/1991 | |
| JP | 07033384 A * | 2/1995 | ............ B66C 13/06 |
| JP | 2012-153455 A | 8/2012 | |

* cited by examiner

*Primary Examiner* — James Keenan
(74) *Attorney, Agent, or Firm* — DLA Piper LLP (US)

(57) ABSTRACT

A transport system prevents swinging of a lift stage at the time of ascent and descent, while appropriately supporting an article shifted from the reference position. The transport system includes a transport device that transfers a green tire to and from a rack part. The transport device includes a lift stage, a support part, and a guided part. The lift stage is provided to be movable upward and downward. The support part is provided on the lift stage and supports an upper inner wall of the green tire from a lower side. The guided part is provided on the lift stage. The rack part is provided with a guide part having a lower portion defining a first gap with the guided part and an upper portion defining a second gap with the guided part.

4 Claims, 17 Drawing Sheets

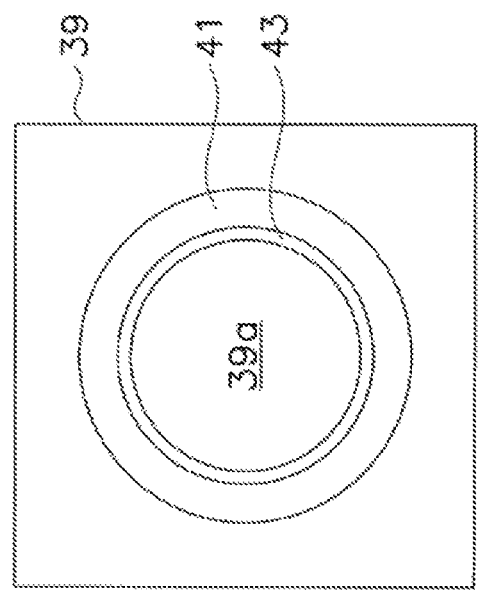

TRANSPORT SYSTEM

CROSS-REFERENCE TO RELATED APPLICATIONS

This application claims priority under 35 U.S.C. 119 to Japanese Patent Application No. 2018-88794, filed on May 2, 2018, which application is incorporated herein by reference in its entirety.

TECHNICAL FIELD

This disclosure relates to a transport system, more particularly, to a transport system including a transport device that lifts and lowers a support part that supports an article, to and from an overhead travelling part.

BACKGROUND

Conventionally, there has been known a transport system including a transport device that transfers an article to and from a station disposed on the floor side by lifting and lowering a lift stage having an article gripping function from an overhead travelling vehicle. The lift stage has a support part that supports the article.

In that transport system, a guide pole is provided on the station side so that the lift stage appropriately ascends and descends, and a positioning member having a hole through which the guide pole can penetrate is provided on the lift stage side (e.g., see Japanese Unexamined Utility Model Publication No. 3-80084).

Operation of the above transport device lifting an article placed on the station will be described. The lift stage descends from the upper position towards the station. When the lift stage descends to a position of the article and stops, the support part of the lift stage performs the operation of supporting the article. At this time, when the article shifts from a reference position and is placed on the station, movement to the guide pole is restricted so that the lift stage cannot move in accordance with article displacement.

Thus, it is conceivable that a diameter of the guide pole is made significantly smaller than a hole diameter of the positioning member. However, if doing so, when the lift stage holding the article rises toward the overhead travelling vehicle, the lift stage swings greatly. Such swinging causes abnormality in a lifting device of the lift stage.

It could therefore be helpful to prevent swinging of a lift stage while appropriately holding an article that is shifted from a reference position in a transport system.

SUMMARY

I thus provide:

A transport system that may include an overhead travelling vehicle that transfers an article to and from a placement part on which articles are placed.

The overhead travelling vehicle has a lift stage, a support part, and a guided part.

The lift stage is provided to be movable upward and downward.

The support part is provided on the lift stage, and supports a held part of the article from the lower side. The guided part is provided on the lift stage.

A guide part is provided on the placement part. The guide part determines a planar position of the guided part.

Further, the guide part has a lower portion and an upper portion. The lower portion ensures, between the lower portion and the guided part, a first gap where the guided part moves horizontally so that the lift stage can follow the article on the placement part. The upper portion ensures a second gap between the upper portion and the guided part to restrict the horizontal movement of the guided part to prevent swinging of the lift stage.

This makes it possible to prevent the swinging of the lift stage while appropriately holding an article that has shifted from the reference position. Hereinafter, the above effect will be described, as an example, as an operation performed when the lift stage descends and supports the article and an operation performed when the lift stage supports the article and rises.

When the lift stage descends and supports the article, upon arrival of the lift stage at a position corresponding to the lower portion of the guide part, a large first gap is ensured between the guided part and the guide part. The first gap is larger than a second gap described later. Thereby, when the lift stage supports the article, the lift stage can follow the article placed on the placement part. As a result, the support part can appropriately support the article.

When the lift stage rises and supports the article, upon arrival of the lift stage at a position corresponding to the upper portion of the guide part, a small second gap is ensured between the guided part and the guide part. The second gap is smaller than the first gap. Thereby, horizontal movement of the lift stage is restricted. As a result, the lift stage can rise smoothly.

The guided part may be a vertically penetrating hole. In this example, the guide part may be a rod-like member extending vertically and guiding the guided part by passing through the hole. Further, the outer shape of the upper portion may be larger than that of the lower portion, and the lower portion may be disposed inside the upper portion in a plan view.

It is thus possible to ensure a sufficiently large first gap in the lower portion of the guide part to cause the lift stage to follow the article, and ensure a sufficiently small second gap in the upper portion to prevent the swinging of the lift stage.

The upper portion and the lower portion may be circular and arranged concentrically in a plan view. Thereby, in whichever direction the guided part advances to or retracts from the guide part when the lift stage ascends or descends, a lifting position of the lift stage can be made appropriate.

The transport system may further include an inner member, an outer member, and a first urging member. The inner member and the outer member are provided in at least one of the upper portion and the guided part. The first urging member is provided between the inner member and the outer member and urges the outer member to a first predetermined position by an elastic force responsive to a positional shift amount of the outer member with respect to the inner member. It is thus possible to reduce an impact caused by collision between the guide part and the guided part at a position where the guided part overlaps the upper portion of the guide part in a height direction.

The transport system may further include a second urging member. The second urging member is provided between the placement part and the guide part, and urges the guide part to a second predetermined position by an elastic force responsive to a positional shift amount of the guide part. It is thus possible to reduce the impact due to collision between the guide part and the guided part on the placement part side of the guide part.

In the transport system, even when an article placed on the placement part is shifted from the reference position, the article can be appropriately supported by the support part.

Further, the swinging of the lift stage at the time of ascent and descent can be prevented.

BRIEF DESCRIPTION OF THE DRAWINGS

FIG. 7B is a view showing a configuration of a first guided member as an alternative example of the second example.

DETAILED DESCRIPTION

1. First Example (1) Configuration of Transport System

Figure 1:
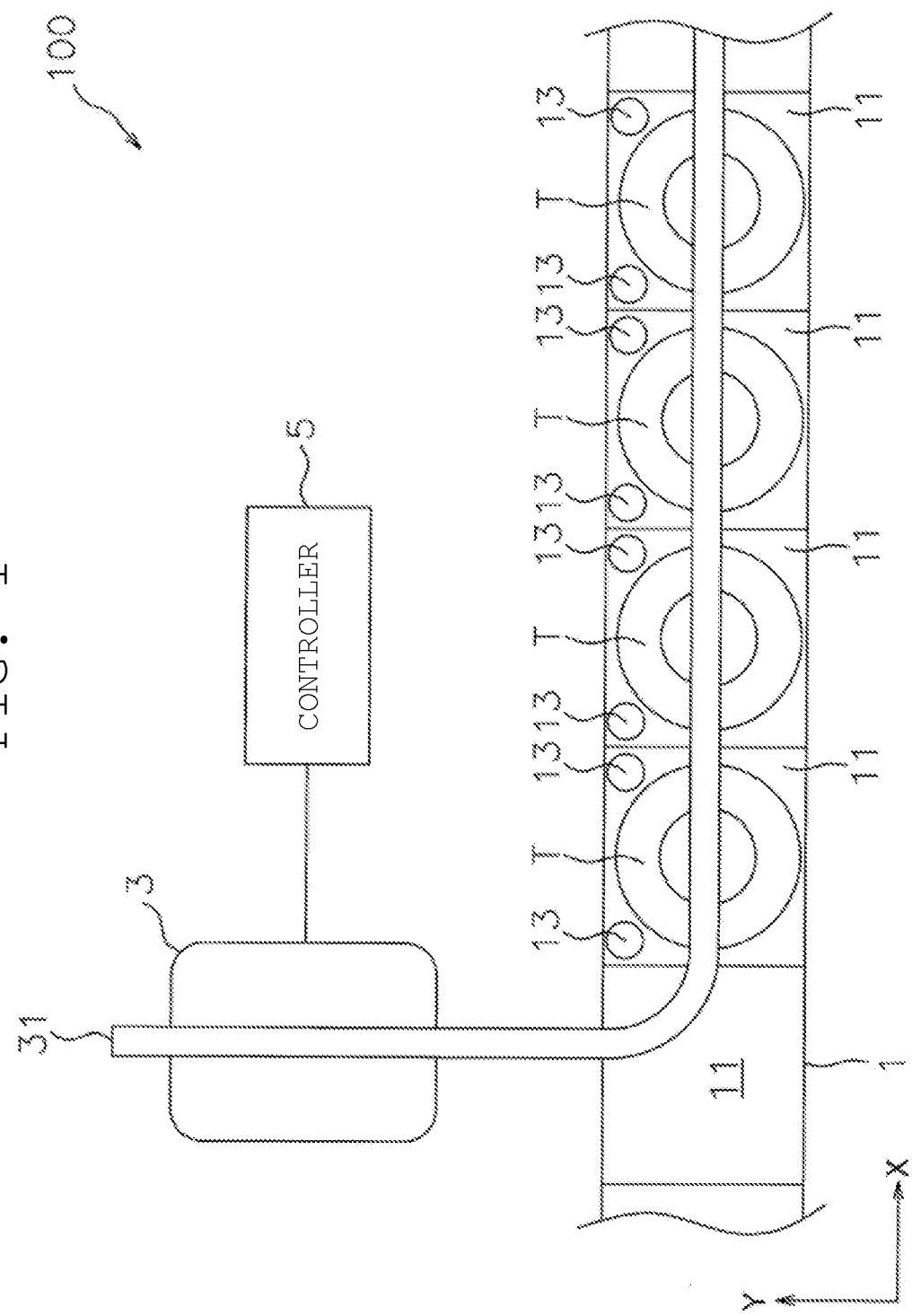
FIG. 1 is a top view of a transport system according to a first example.
Figure 2:
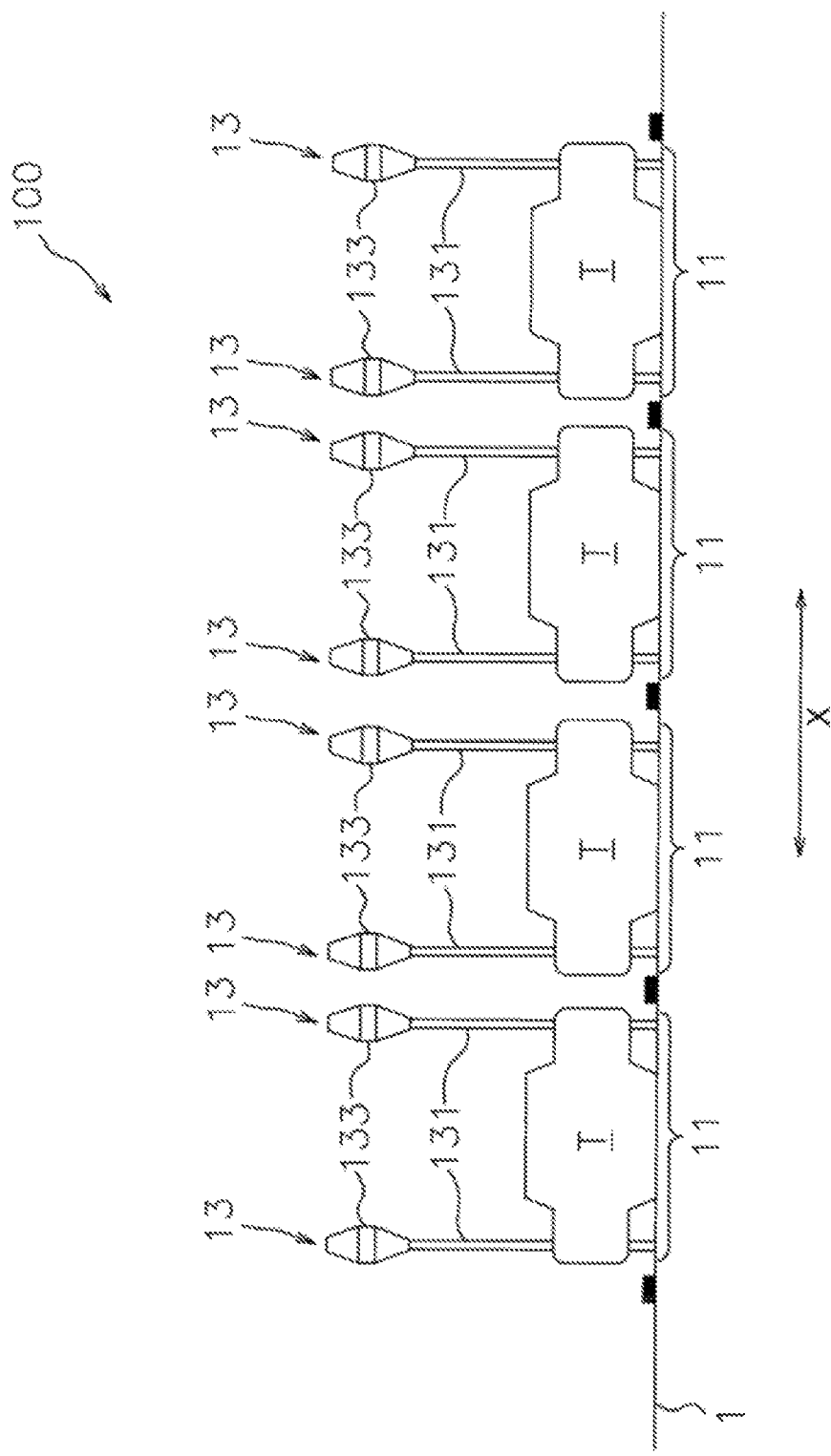
FIG. 2 is a side view of the transport system.

A configuration of a transport system 100 according to a first example will be described with reference to FIGS. 1 and 2. FIG. 1 is a top view of the transport system according to the first example. FIG. 2 is a side view of the transport system.

The transport system 100 may be a system that transports a green tire T (a tire before vulcanization) (an example of an article) placed on a station 1.

A lateral direction in FIG. 1 is defined as a first horizontal direction (an arrow X), and a vertical direction is defined as a second horizontal direction (an arrow Y).

The transport system 100 includes the station 1 (an example of a placement part). The station 1 extends along the first horizontal direction and has a rack part 11 formed by being divided into a plurality of parts. The green tire T is placed on the rack part 11.

A pair of guide parts 13 are provided in each rack part 11 along the first horizontal direction. Positions of the pair of guide parts 13 in the second horizontal direction coincide with each other. A midpoint of a straight line connecting the pair of guide parts 13 coincides with a midpoint of the rack part 11 in the first horizontal direction.

The transport system 100 includes a transport device 3 (an example of an overhead travelling vehicle). The transport device 3 is provided on a ceiling and runs along a rail 31.

The transport system 100 includes a controller 5. The controller 5 is a computer system having, for example, a CPU, a storage device (a large-capacity storage device such as a RAM, a ROM, a hard disk, or an SSD), various interfaces, a display and the like, and controls the transport device 3. The controller 5 may be realized by hardware such as a system-on-a-chip (SoC).

(2) Guide Part

Figure 3A:
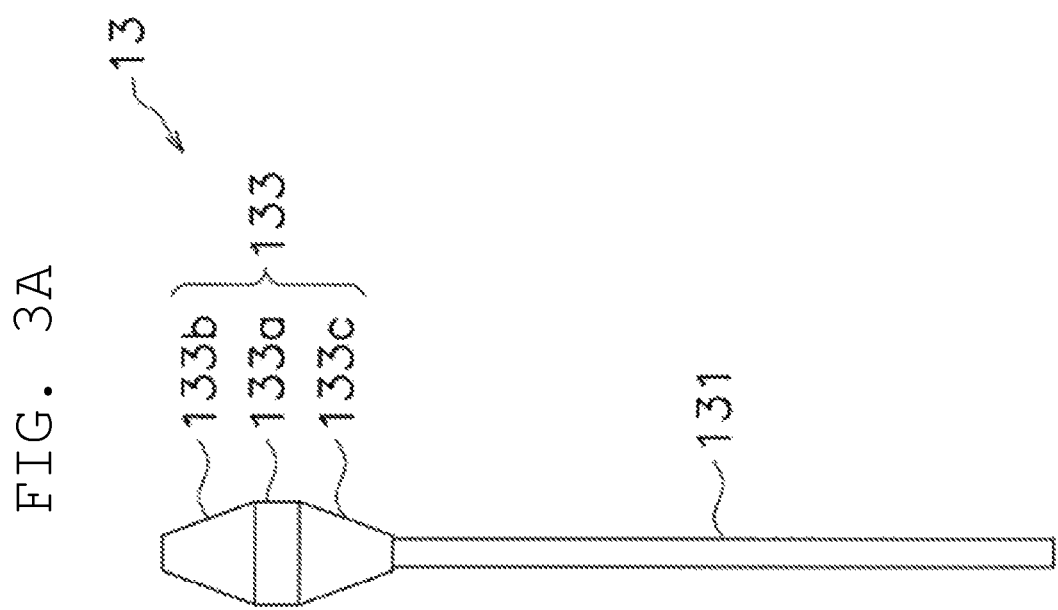
FIG. 3A is a side view of a guide part.
Figure 3B:
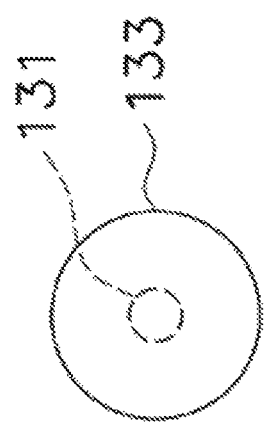
FIG. 3B is a view of the guide part as viewed from above.

A specific configuration of the guide part 13 will be described with reference to FIGS. 2 to 3B. FIG. 3A is a side view of the guide part 13. FIG. 3B is a view of the guide part 13 as viewed from above.

The guide part 13 is a rod-shaped member extending vertically, and has a lower portion 131 and an upper portion 133.

As shown in FIGS. 3A and 3B, the lower portion 131 is a vertically extending rigid member, and has a circular shape in a plan view. Further, as shown in FIG. 2, a vertical length of the lower portion 131 is greater than a height of the green tire T placed on the rack part 11.

As shown in FIGS. 3A and 3B, the upper portion 133 is a rigid member having a circular shape in a plan view. In addition, the upper portion 133 has a larger outer shape than the lower portion 131, and the lower portion 131 is arranged concentrically inside the upper portion 133 in a plan view. Further, as shown in FIG. 3A, the upper portion 133 is attached to the upper end of the lower portion 131, and is thereby disposed at a position higher than the uppermost surface of the green tire T placed on the rack part 11. The upper portion 133 has a cylindrical part 133a and tapered parts 133b, 133c above and below the cylindrical part 133a.

(3) Transport Device

Figure 4:
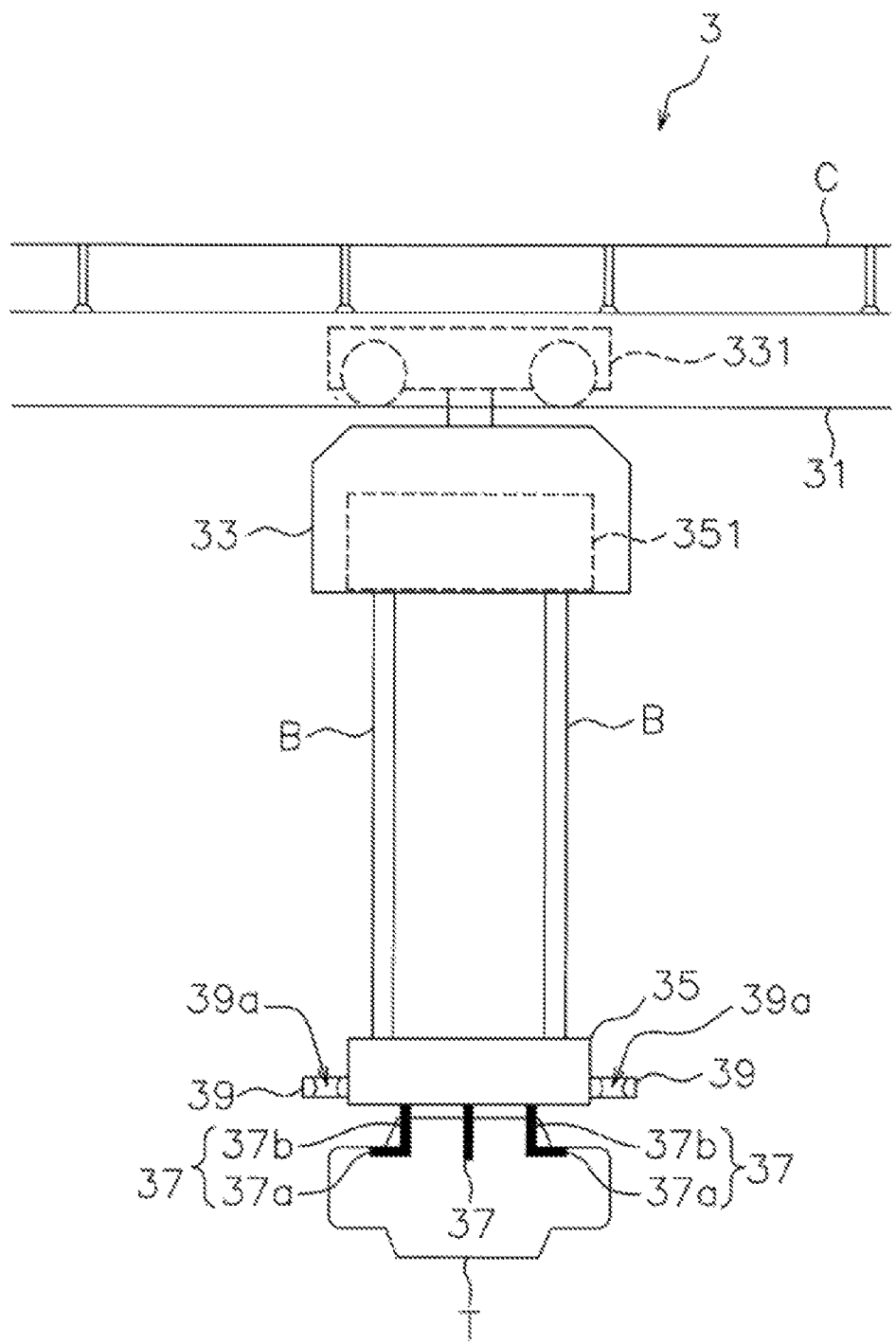
FIG. 4 is a view showing an overall configuration of a transport device.

Hereinafter, a configuration of the transport device 3 as an overhead travelling vehicle will be described in detail with reference to FIG. 4. FIG. 4 is a view showing an entire configuration of the transport device 3.

The transport device 3 (an example of the overhead travelling vehicle) is a device that transfers the green tire T to and from the rack part 11.

The transport device 3 has an overhead travelling part 33. The overhead travelling part 33 moves along the rail 31 installed on a ceiling C by a truck frame 331 travelling inside the C-shaped rail 31. The overhead travelling part 33 has a lift driving part 351 therein. The transport device 3 has a lift stage 35. The lift stage 35 is hung vertically from the overhead travelling part 33 by a belt B of a lift driving part 351. By winding or feeding the belt B to suspend the lift stage 35 by a pulley (not shown) of the lift driving part 351, the lift stage 35 is movable upward and downward with respect to the overhead travelling part 33.

The lift stage 35 has a support part 37. In this example, four support parts 37 are provided on a predetermined circumference at an angle of 90°. Each of the four support parts 37 has a horizontally extending horizontal portion 37a and a vertical portion 37b. The horizontal portion 37a may contact an upper inner wall of the green tire T (an example of the held part of the article), and supports the green tire T from the lower side.

The vertical portion 37b extends vertically and connects the horizontal portion 37a at the lower end. The vertical portions 37b are attached to the lift stage 35 to separate from or come close to each other by sliding horizontally. The vertical portions 37b are horizontally separated or brought close to each other, thereby enabling a change in distance between each of the four support parts 37 (horizontal portions 37a).

The lift stage 35 has a first guided member 39. The first guided member 39 is provided at each end in a direction in which the rail 31 of the lift stage 35 extends. The first guided member 39 is not restricted to when the first guided member 39 is provided at each end in the direction parallel to the direction in which the rail 31 of the lift stage 35 extends. The first guided member 39 may be provided only at either end part of the lift stage 35 in the above direction.

The first guided member 39 is provided with a through-hole penetrating vertically as a guided part 39a. The guided part 39a has the smallest diameter on a vertical middle, and has a shape in which the diameter increases upward and downward from the middle. That is, the guided part 39a is vertically tapered to facilitate the upper portion 133 formed in a tapered shape to be guided into the guided part 39a.

The minimum diameter of the guided part 39a is slightly larger than a diameter of the cylindrical part 133a of the upper portion 133 in a plan view. For example, when the diameter of the cylindrical part 133a of the upper portion 133 is 48 mm and the diameter of the lower portion 131 is 16 mm, the minimum diameter of the guided part 39a can be set to 52 mm.

(4) A Transfer Operation of a Green Tire

A transfer operation of the green tire T in the transport system 100 will be described with reference to FIGS. 5 to 6D. Specifically, as shown in FIG. 5, the transfer operation performed when the green tire T is placed as horizontally shifted from a center $C_{ST}$ of the rack part 11 will be described.

Figure 5:
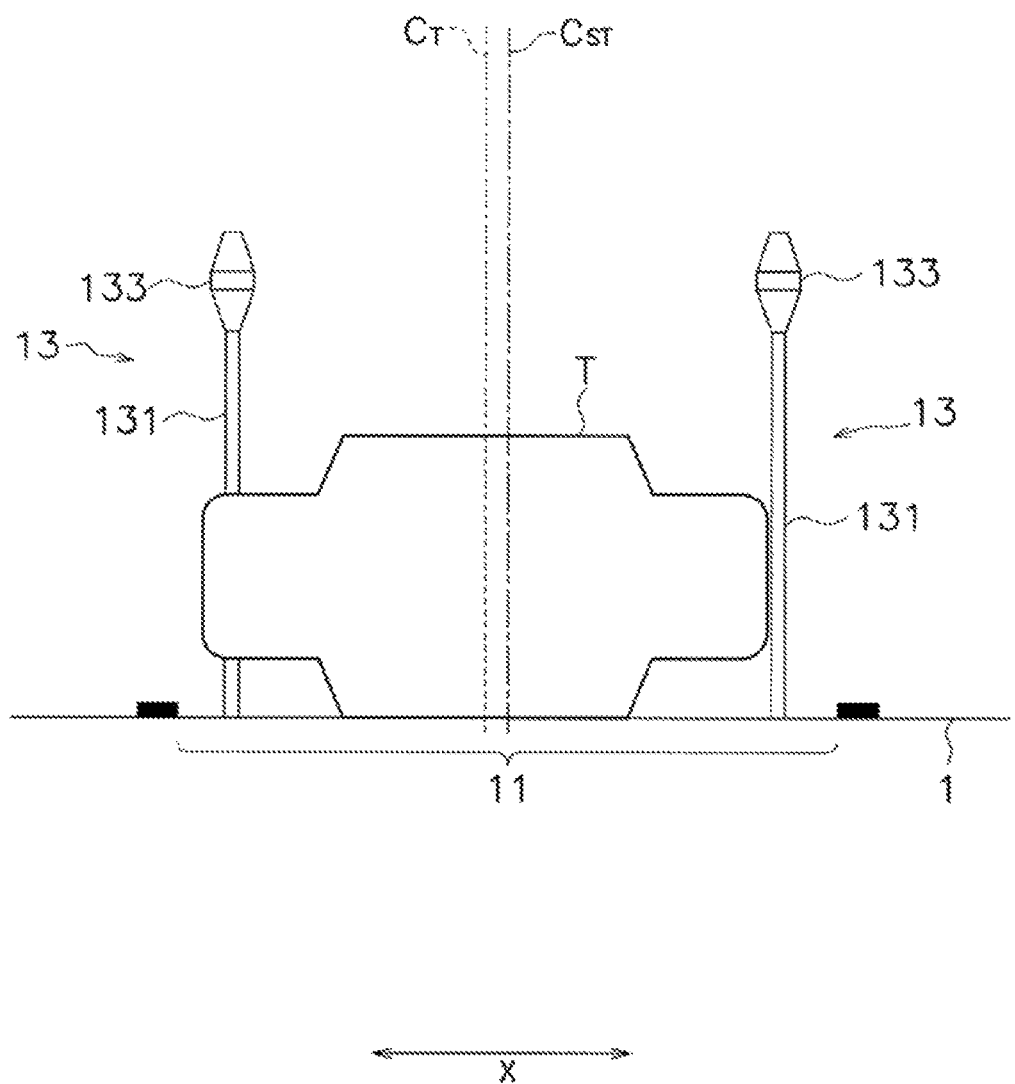
FIG. 5 is a view showing an example of a state in which a green tire has been placed while being horizontally shifted from a center of a rack part.
Figure 6A:
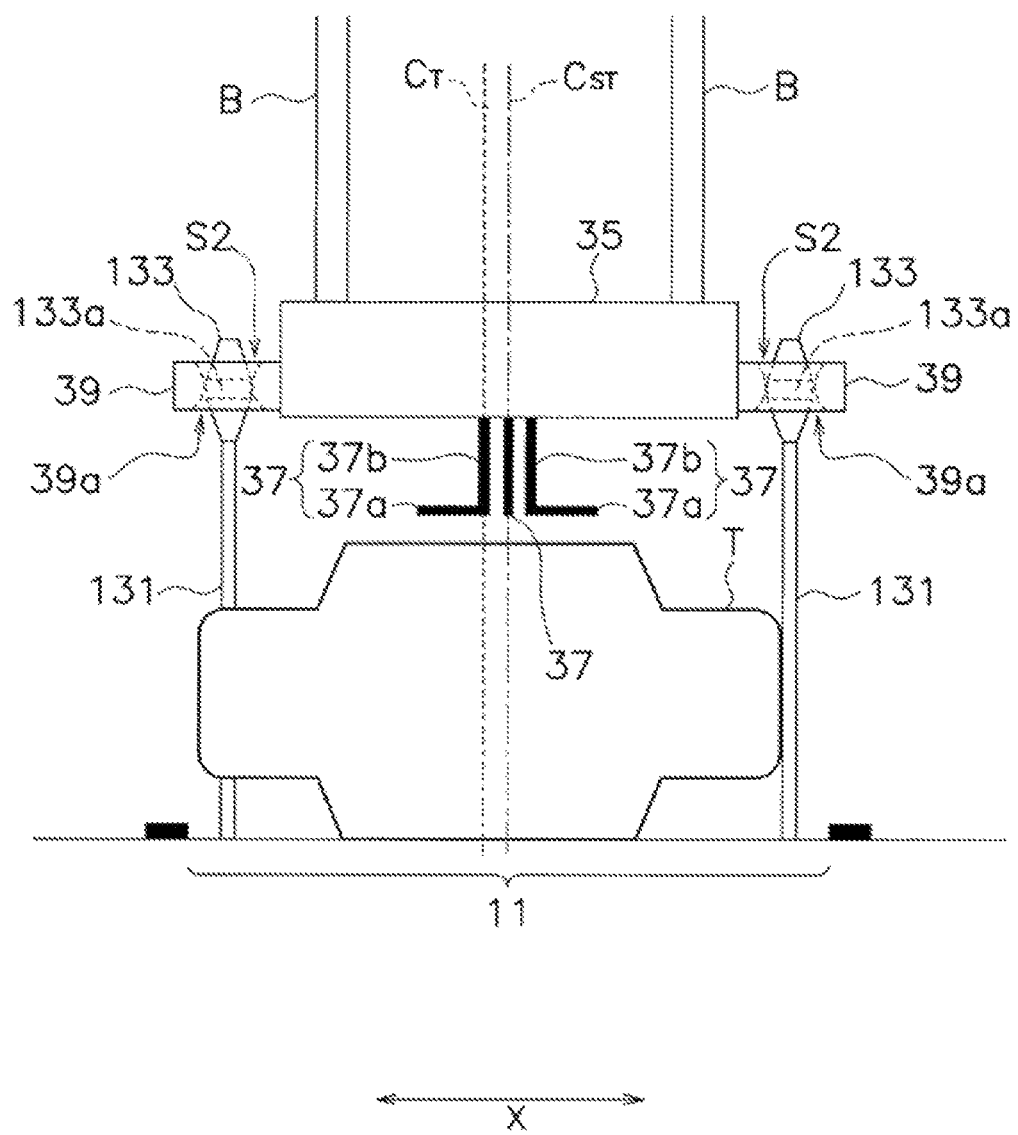
FIG. 6A is a view showing a state in which a guided part is guided by an upper portion when a lift stage descends.
Figure 6B:
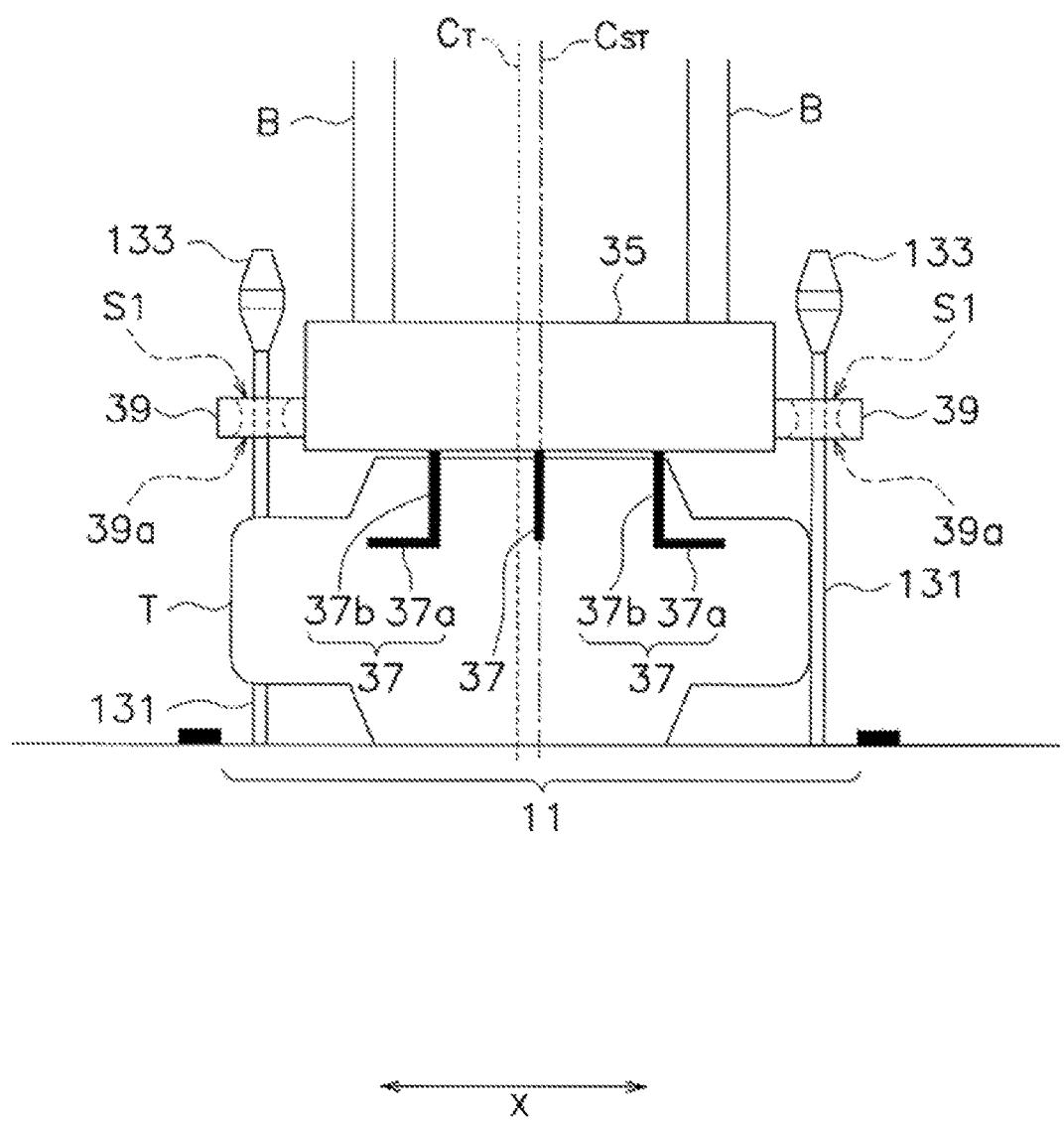
FIG. 6B is a view schematically showing how the green tire placed as shifted on the rack part is supported by a support part.
Figure 6C:
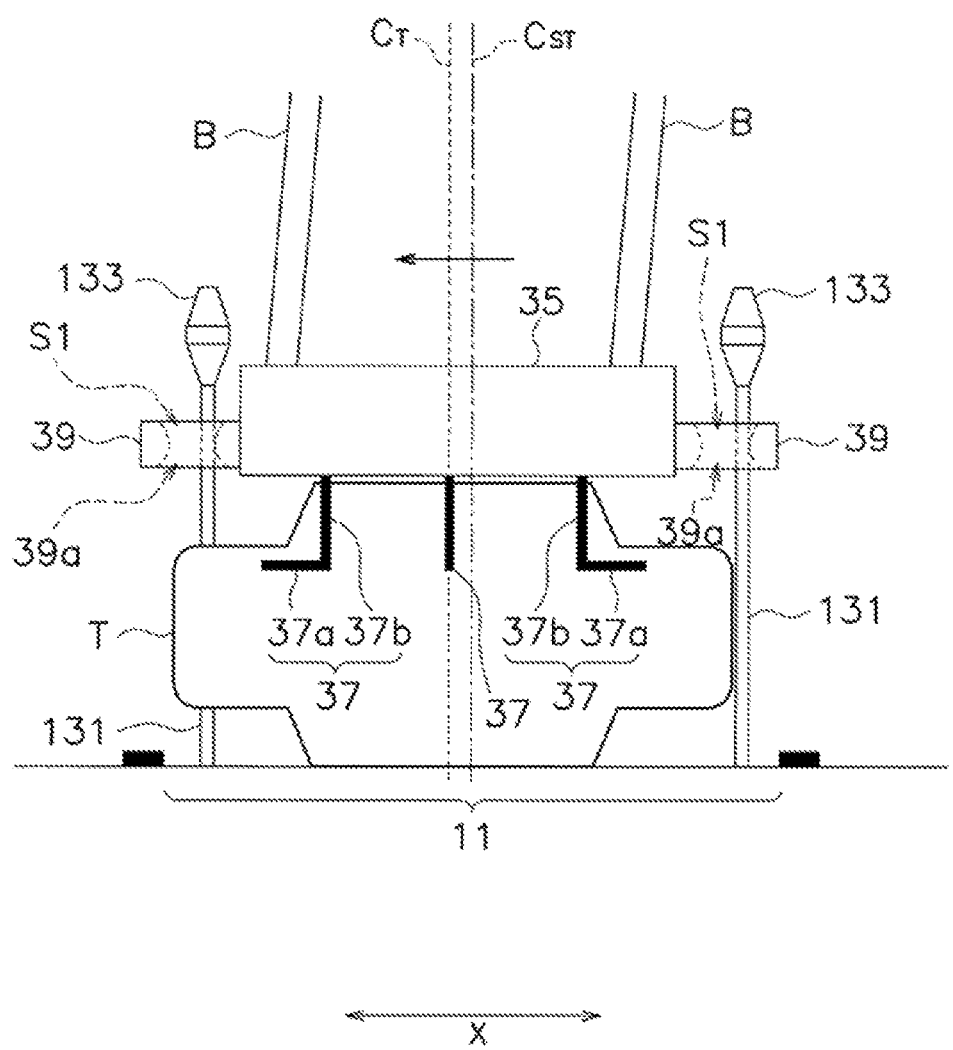
FIG. 6C is a view schematically showing a state in which the lift stage is moved horizontally by movement of the support part.
Figure 6D:
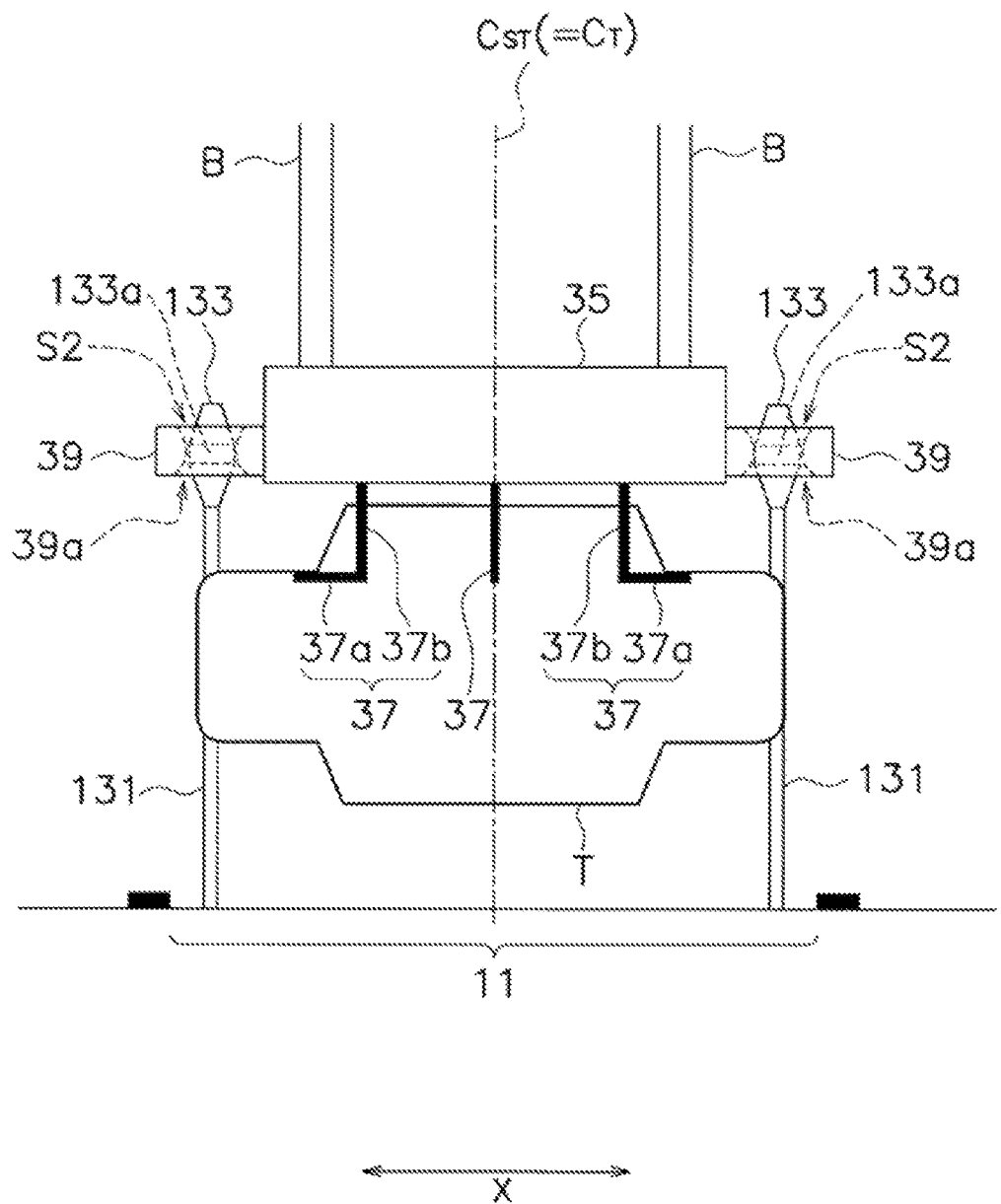
FIG. 6D is a view showing a state in which the guided part is guided by the upper portion when the lift stage rises.

FIG. 5 is a view showing an example of a state in which the green tire T is placed in a state horizontally shifted from the center $C_{ST}$ of the rack part 11. FIG. 6A is a view showing a state where the guided part 39a is guided by the upper portion 133 when the lift stage 35 descends. FIG. 6B is a view schematically showing how the green tire T placed as shifted on the rack part 11 is supported by the support part 37. FIG. 6C is a view schematically showing a state in which the lift stage 35 has been moved horizontally by the movement of the support part 37. FIG. 6D is a view showing a state in which the guided part 39a is guided by the upper portion 133 when the lift stage 35 rises.

The following operation is performed based on a command from the controller 5.

First, the lift stage 35 starts to descend from the upper position toward the rack part 11. When the lift stage 35 reaches a height of the upper portion 133 of the guide part 13, as shown in FIG. 6A, the guided part 39a is guided by the upper portion 133 (more specifically, the minimum diameter portion of the guided part 39a is guided by the cylindrical part 133a of the upper portion 133). At this time, the midpoint of the straight line connecting the pair of guide parts 13 coincides with the midpoint of the rack part 11 in the first horizontal direction. Therefore, a center of the lift stage 35 coincides with the center $C_{ST}$ of the rack part 11. A small second gap S2 is ensured between the minimum diameter portion of the guided part 39a and the cylindrical part 133a. Therefore, the lift stage 35 does not move horizontally while the center of the lift stage 35 coincides with the center $C_{ST}$ of the rack part 11.

Next, the lift stage 35 descends to a position where the horizontal portion 37a is lower than the upper inner wall of the green tire T. Thereafter, the support parts 37 move in directions away from each other. As a result, the horizontal portion 37a enters below the upper inner surface of the green tire T. At this time, since a center CT of the green tire T is shifted horizontally from the center $C_{ST}$ of the rack part 11, as shown in FIG. 6B, in a state where the support parts 37 do not sufficiently separate from each other, only the horizontal portion 37a enters below the upper inner wall of the green tire T. On the other hand, the other horizontal portion 37a has not yet reached below the upper inner wall.

Next, the support parts 37 further separate from each other. Then, a part of the vertical portion 37b contacts the green tire T and pushes the lift stage 35 horizontally. Since a sufficiently large first gap S1 exists between the guided part 39a and the lower portion 131, as shown in FIG. 6C, due to a reaction force generated when the vertical portion 37b pushes the green tire T, the lift stage 35 moves horizontally.

Thereafter, when the support parts 37 separate from each other to have a predetermined distance therebetween, the lift stage 35 moves horizontally until the center of the lift stage 35 coincides with the horizontal center CT of the green tire T, as shown in FIG. 6C. As a result, the four horizontal portions 37a enter below the upper inner wall of the green tire T. That is, the green tire T can be appropriately supported by the four horizontal portions 37a.

In this way, the guided part 39a moves horizontally in the first gap 51 formed between the guided part 39a and the lower portion 131, and the lift stage 35 can follow the green tire T on the rack part 11. "The lift stage 35 follows" means that the lift stage 35 relatively moves with respect to the green tire T so that the support part 37 appropriately supports the green tire T by a force generated by the support part 37 coming into contact with a predetermined portion of the green tire T.

In this example, "the lift stage 35 follows" corresponds to that the lift stage 35 moves horizontally by the reaction force generated by the vertical portion 37b contacting the green tire T, and the center of the lift stage 35 coincides with the center CT of the green tire T.

Thereafter, the lift stage 35 rises toward the overhead travelling part 33. When the green tire T separates from the placement surface of the rack part 11, the lift stage 35 vibrates horizontally. However, when the lift stage 35 further rises, the guided part 39a is guided by the upper portion 133 (specifically, the minimum diameter portion of the guided part 39a is guided by the cylindrical part 133a of the upper portion 133). At this time, as shown in FIG. 6D, the small second gap S2 is ensured between the minimum diameter portion of the guided part 39a and the cylindrical part 133a. Therefore, the movement of the lift stage 35 horizontally is restricted and, as a result, the horizontal vibration is reduced.

In this way, the second gap S2 formed between the guided part 39a and the upper portion 133 can restrict the horizontal movement of the guided part 39a and prevent the swinging of the lift stage 35. "Prevent the swinging of the lift stage 35" means to set the amplitude of the horizontal swing of the lift stage 35 to be equal to or smaller than the second gap S2.

In this example, "prevent the swinging of the lift stage 35" corresponds to the following: even when the lift stage 35 tries to vibrate horizontally with an amplitude equal to or larger than the second gap S2, the guided part 39a collides with the upper portion 133. Hence, a distance in which the guided part 39a moves horizontally does not become equal to or larger than the second gap S2.

As described above, the lift stage 35 can rise smoothly toward the overhead travelling part 33 in a state where horizontal vibration is prevented. In addition, by preventing the vibration when the lift stage 35 rises, it is possible to prevent, for example, occurrence of an abnormality such that the belt B rubs off due to contact with the pulley of the lift driving part 351.

2. Second Example

The upper portion 133 described in the first example may have viscoelastic properties.

Figure 7A:
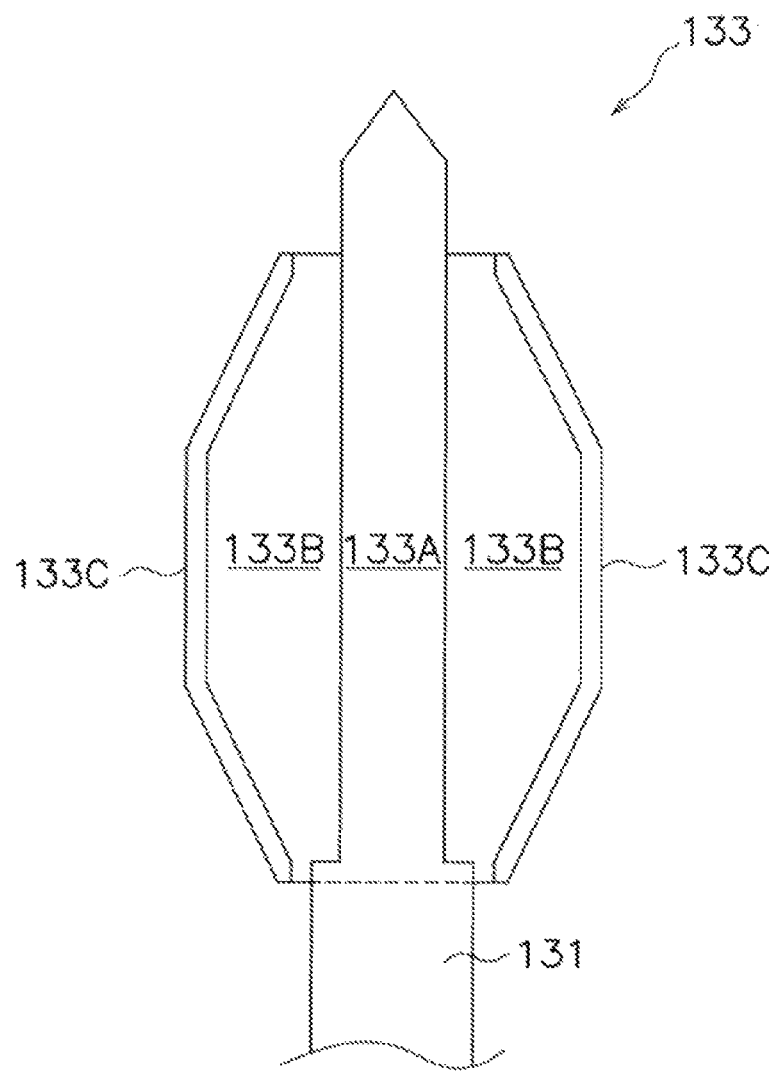
FIG. 7A is a view showing a configuration of an upper portion according to a second example.

A specific configuration of the upper portion 133 according to the second example will be described with reference to FIG. 7A. FIG. 7A is a view showing the configuration of the upper portion according to the second example.

As shown in FIG. 7A, the upper portion 133 has an inner member 133A, a first urging member 133B, and an outer member 133C. The inner member 133A has a structure penetrating the first urging member 133B. For example, the inner member 133A is a part of the lower portion 131 having a sharp tip as shown in FIG. 7A. The first urging member 133B is an elastic member. An elastic member that can be used as the first urging member 133B is a spring or the like. In addition, the first urging member 133B may be made of a material having viscoelastic properties such as rubber, a silicone material, or a gel material.

The first urging member 133B is fixed to the inner member 133A by penetration of the inner member 133A. The outer member 133C is a member made of metal or resin, made to adhere to the surface of the first urging member 133B.

As an example, it is assumed that the outer member 133C is shifted with respect to the inner member 133A due to collision between the upper portion 133 and the guided part 39a during the rise of the lift stage 35. At this time, the first urging member 133B generates an elastic force responsive to a positional shift amount. Due to the elastic force, the outer member 133C is urged to a first predetermined position before the shift. Further, the first urging member 133B absorbs vibration energy generated by a collision between the upper portion 133 and the guided part 39a. As described above, the upper portion 133 having the above configuration can reduce the impact caused by the collision between the guide part 13 and the guided part 39a.

As an alternative example of the second example, for example, it is possible to use as the upper portion 133 one formed by coating the first urging member 133B made of rubber or the like with a coating such as resin coating as the outer member 133C.

As a further alternative example, members corresponding to the inner member 133A, the first urging member 133B, and the outer member 133C may be provided on the first guided member 39 side. A specific configuration of the first guided member as the alternative example of the second example will be described with reference to FIG. 7B. FIG. 7B is a view showing a configuration of the first guided member as the alternative example of the second example.

As shown in FIG. 7B, in this alternative example, the first guided member 39 is taken as an outer member, a short cylindrical first member 41 made of a material having viscoelastic properties is fixed as a member corresponding to the first urging member to the inner wall of the through-hole provided in the first guided member 39, and a second member 43 formed of short cylindrical metal, resin, or plastic material on the inner wall of the first member 41 is fixed as a member corresponding to the inner member. In this example, the hole formed by the inner wall of the second member 43 becomes the guided part 39a.

3. Third Example

Figure 8A:
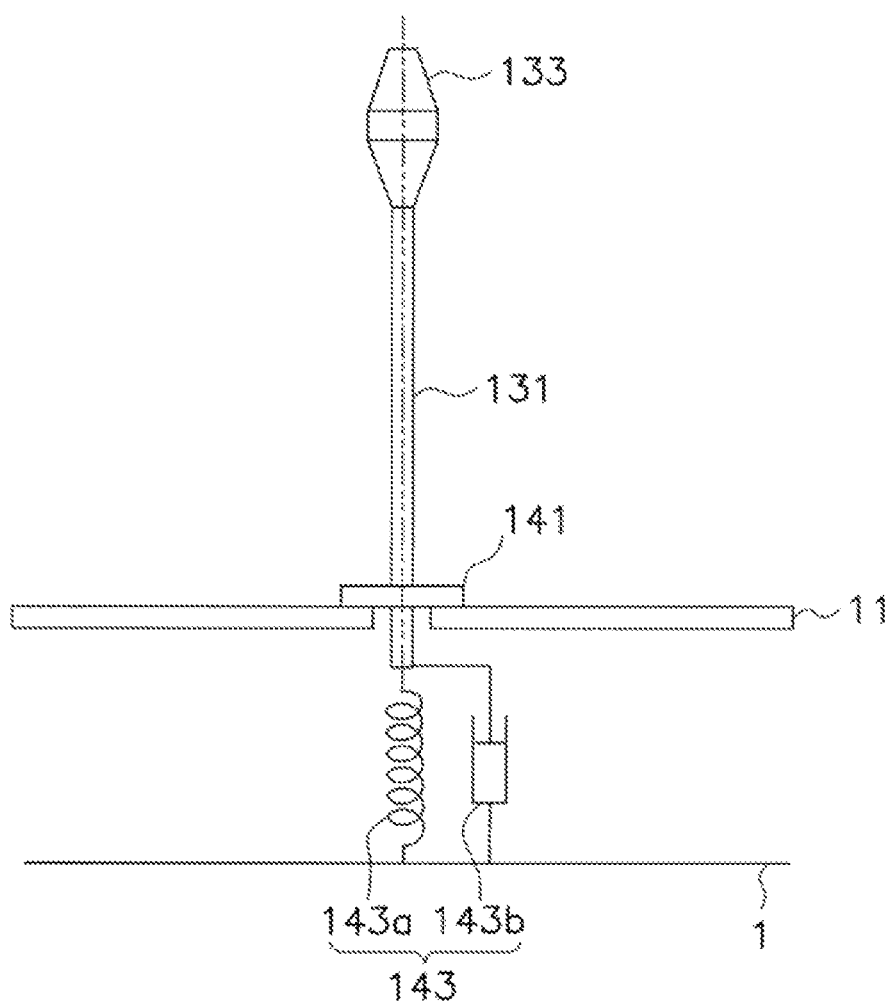
FIG. 8A is a view showing a configuration of a lower portion according to a third example.

The lower portion 131 may be able to be inclined in a viscoelastic manner with respect to the vertical direction. A specific configuration of a lower member according to a third example will be described with reference to FIG. 8A. FIG. 8A is a view showing the configuration of the lower member according to the third example.

As shown in FIG. 8A, in this alternative example, a cover member 141 and a second urging member 143 are provided at the base end of the lower portion 131.

The cover member 141 is provided on the lower portion 131 to close a hole into which the base end of the lower portion 131 has been inserted. A portion in contact with the cover member 141 of the rack part 11 or the entire cover member 141 is made of, for example, rubber, resin having viscoelastic properties, plastic material or the like.

The second urging member 143 is provided between the inside of the station 1 and the lower portion 131 and includes an elastic member 143a and a viscous member 143b. The elastic member 143a is, for example, a spring having one end fixed to the base end of the lower portion 131 and the other end fixed inside the station 1. When the lower portion 131 of the elastic member 143a is inclined with respect to the vertical direction, an elastic force responsive to a positional shift amount of the base end of the lower portion 131 with respect to the rack part 11 is generated. At this time, the base end of the lower portion 131 is urged so that the lower portion 131 faces the vertical direction (an example of the second predetermined position). The viscous member 143b is, for example, a dash pod having one end fixed to the base end of the lower portion 131 and the other end fixed inside the station 1.

Figure 8B:
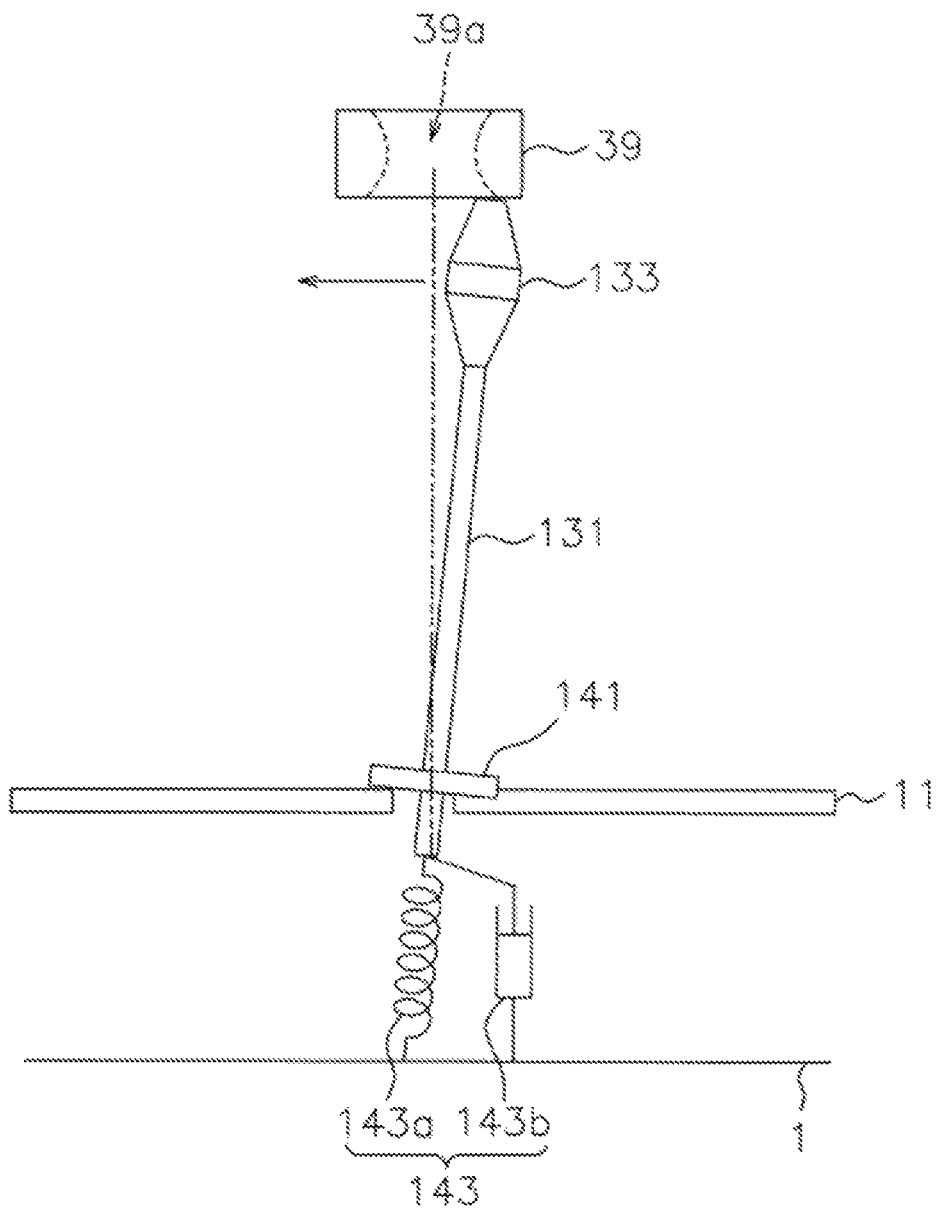
FIG. 8B is a view schematically showing the state of the guide part when a first guided member collides with the upper portion.

The principle of the second urging member 143 reducing the impact caused by collision between the guide part 13 and the guided part 39a when the lift stage 35 rises will be described with reference to FIG. 8B. FIG. 8B is a view schematically showing a state of the guide part 13 when the first guided member 39 collides with the upper portion 133 when the lift stage 35 rises.

When the first guided member 39 collides with the upper portion 133, as shown in FIG. 8B, the lower portion 131 is inclined with respect to the vertical direction. Along with this inclination, the elastic member 143a and the viscous member 143b are deformed to absorb energy due to the collision. "The viscous member 143b is deformed" means that the piston of the dash pod is shifted from a standard position.

The deformed elastic member 143a urges the base end of the lower portion 131 such that the lower portion 131 faces upward and downward. The guided part 39a is guided by the upper portion 133 while the lower portion 131 returns to its original position by the urging force.

The viscous member 143b absorbs vibration energy generated by the collision between the upper portion 133 and the guided part 39a, and quickly returns the lower portion 131 vertically.

By providing the second urging member 143 and enabling reduction in the impact caused by the collision between the guide part 13 and the guided part 39a, it is possible to reduce the impact caused by the collision. This eliminates the need to lower the lifting speed of the lift stage 35 in the vicinity of the guide part 13. As a result, the transfer operation time of the green tire T can be shortened.

Figure 9:
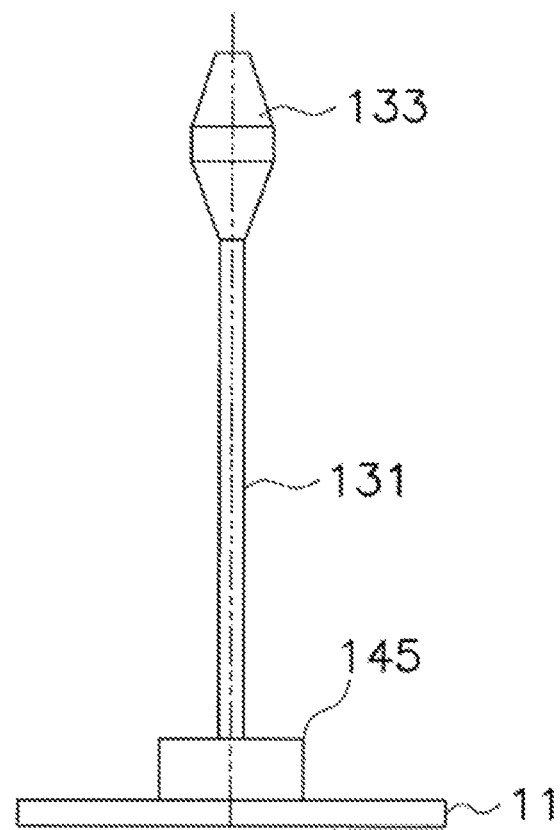
FIG. 9 is a view showing a configuration of a second urging member as an alternative example of the third example.

As an alternative example of the third example, the second urging member may have another configuration. Hereinafter, a specific configuration of the second urging member as an alternative example of the third example will be described with reference to FIG. 9. FIG. 9 is a view showing a configuration of a second urging member as an alternative example of the third example.

As shown in FIG. 9, in this alternative example, an elastic body 145 having elastic properties is provided corresponding to the above second urging member. The elastic body 145 has the lower end fixed to the rack part 11, and the upper end fixing the base end of the lower portion 131. The elastic body 145 is an elastic member. Elastic member usable as the elastic body 145 may be a spring or the like. Other than that, the elastic body 145 can be made of, for example, rubber, resin having viscoelastic properties or the like.

As a further alternative example, the base end part near the rack part 11 of the lower portion 131 or the entire lower portion 131 may be made of a plastic material (e.g., special urethane resin, synthetic rubber and the like) that generates a restoring force by deformation.

By the above urging member having the viscoelastic properties, the collision between the first guided portion 39 and the upper portion 133 can be reduced by its elastic properties, and the vibration energy due to the collision can be absorbed by the viscous characteristic and the vibration can be reduced.

4. Fourth Example

Conversely to the first to third examples, the guide part may have a hole shape and the guided part may be a member passing through the hole of the guide part.

Figure 10A:
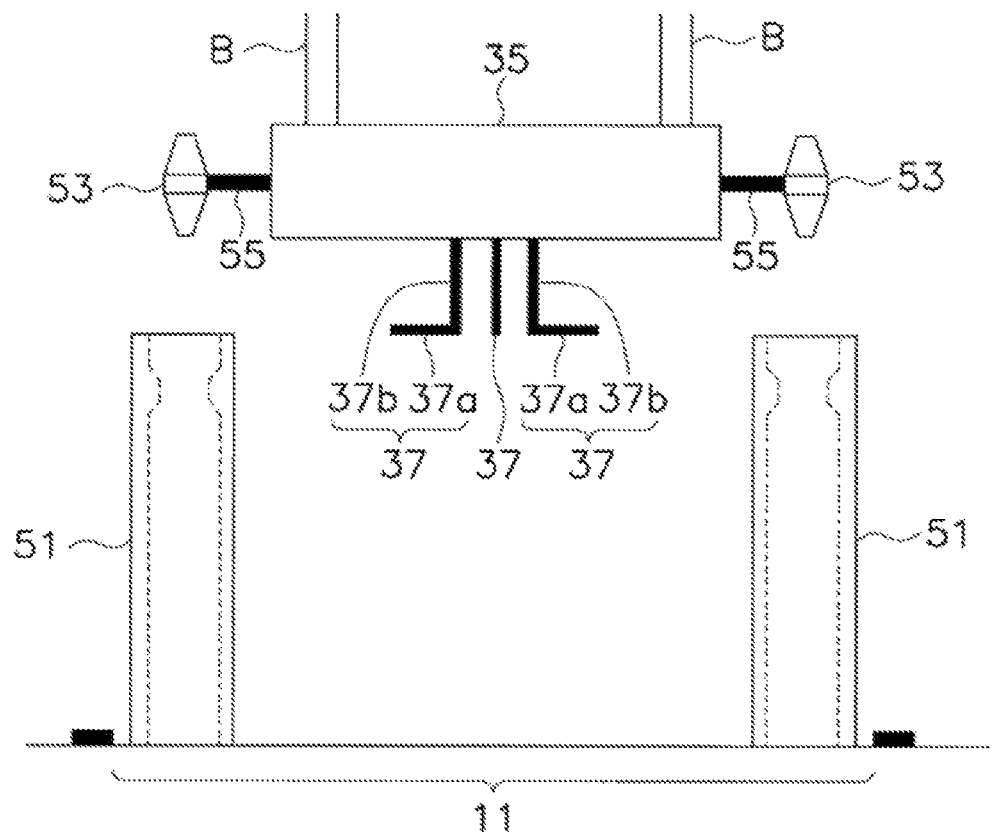
FIG. 10A is a side view of a rack part provided with a guide part according to a fourth example and a lift stage provided with a guided part according to the fourth example.
Figure 10B:
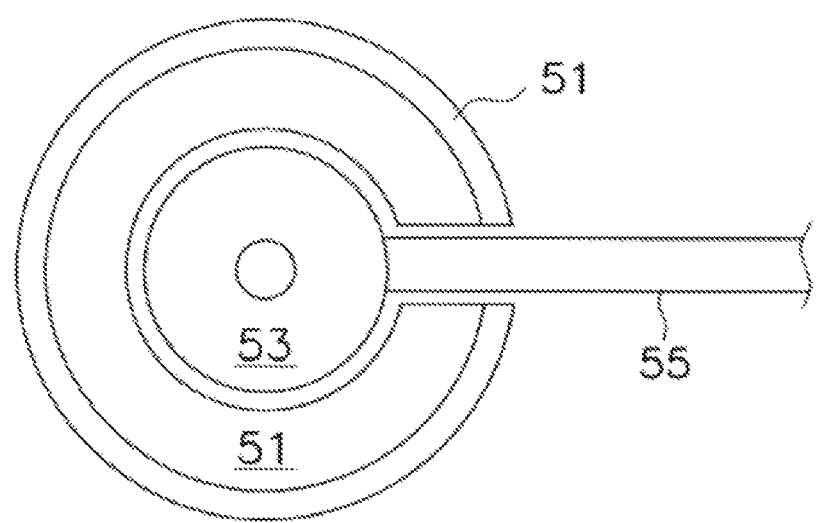
FIG. 10B is a view of a second guided member inserted into a hollow portion of a guide member as viewed from above.

A specific configuration of a guide part and a guided part according to a fourth example will be described with reference to FIGS. 10A and 10B. FIG. 10A is a side view of the rack part 11 provided with the guide part according to the fourth example and the lift stage 35 provided with the guided part according to the fourth example. FIG. 10B is a view of the second guided member 53 inserted in a hollow portion of a guide member 51 as viewed from above.

As shown in FIGS. 10A and 10B, the hollow guide member 51 having a C-shape in a plan view is erected from the rack part 11. In the upper portion of the guide member 51, a part of the hollow portion is made smaller in diameter than the other part.

Meanwhile, a second guided member 53 that can penetrate the hollow portion of the guide member 51 is attached to the lift stage 35 via a shaft 55. A diameter of the second guided member 53 in a plan view is slightly smaller than the minimum diameter of the hollow portion of the guide member 51.

When the lift stage 35 ascends and descends in the vicinity of the rack part 11, the second guided member 53 passes through the hollow portion of the guide member 51, and the shaft 55 passes through a C-shaped gap portion of the guide member 51. On the lower side of the hollow portion of the guide member 51, a relatively large first gap is formed between the second guided member 53 and the hollow portion, and the lift stage 35 can move horizontally. On the other hand, at a position where the diameter of the hollow portion in the upper portion of the guide member 51 is small, a small second gap is formed between the second guided member 53 and the hollow portion, to restrict horizontal movement of the lift stage 35.

As an alternative example, in the lower portion of the guide member 51, a size of the C-shaped gap portion through which the shaft 55 passes may be made larger than a size of the gap portion in the upper portion of the guide member 51. Thus, in the lower portion of the guide member 51, the degree of freedom of horizontal movement of the lift stage 35 can be increased.

5. Structure/Functionality Common to the Examples

The first to fourth examples have the following configurations and functions.

The transport system (e.g., the transport system 100) includes an overhead travelling part (e.g., an overhead travelling part 33), a lift stage (e.g., the lift stage 35), a support part (e.g., the support part 37), a guided part (e.g., the guided part 39a, the second guided member 53), and a guide part (e.g., the guide part 13 or the guide member 51). The overhead travelling part transfers an article to and from a placement part (e.g., the station 1) on which the article (e.g., the green tire T) is placed. The lift stage is provided to be movable upward and downward with respect to the overhead travelling part. The support part is provided on the lift stage, and supports a held part of the article from the lower side. The guided part is provided on the lift stage 35. The guide part is provided on the placement part, and determines a planar position of the guided part.

The guide part has a lower portion (e.g., the lower portion 131) and an upper portion (e.g., the upper portion 133). The lower portion and the guided part ensure, therebetween, a first gap (e.g., the first gap S1) in which the guided part moves horizontally so that the lift stage can follow the article on the placement part. The upper portion and the guided part ensure, therebetween, a second gap (e.g., the second gap S2) to restrict the horizontal movement of the guided part and to prevent swinging of the lift stage when the article supported by the support part is lifted.

Operation of the lift stage descending and supporting the article will be described. When the lift stage reaches a position corresponding to the lower portion of the guide part, a first gap is ensured between the guided part and the guide part. This enables the lift stage to follow the article placed on the placement part and, as a result, the support part can appropriately support the article.

Operation of the lift stage supporting the article and rising will be described. When the lift stage reaches a position corresponding to the upper portion of the guide part, a second gap is ensured between the guided part and the guide part. This restricts the horizontal movement of the lift stage, and the lift stage can rise smoothly.

6. Other Examples

Although the plurality of examples have been described above, this disclosure is not restricted to the above examples, and various changes can be made in a range not deviating from the scope of the disclosure. In particular, the plurality of examples and alternative examples described herein can be combined in a freely selected manner as required.

The support part may be capable of supporting a member other than the green tire T from below. For example, the support part may be a member that supports a tray that places an article, a container that stores an article or the like. In this example, the support part is caused to move inward from the outside of the tray or the container, and the tray or container is supported in a horizontal portion of the support part. In this example, if a placement position of the tray or the container is shifted, when a part of the support part contacts the tray or the container during movement of the support part, the lift stage 35 moves in a direction opposite to a movement direction of the support part in contact with the tray or the container. Thereby, the lift stage 35 can follow the tray or the container.

This enables horizontal movement of the lift stage 35 in the position where the support part supports the tray or the container. Further, by determining the shapes and dimensions of the guide part and the guided part to prevent the horizontal movement in the other portions, the same effects as those of the first to fourth examples can be obtained.

In addition, the technique described in the examples can be applied to an overhead travelling vehicle that conveys a front opening unified pod (FOUP) accommodating a semiconductor wafer as an article.

In the overhead travelling vehicle, the support part supporting the FOUP is caused to move inward from the outside of the FOUP to support the FOUP. In this example, if a placement position of the FOUP is shifted, when a part of the support part comes into contact with the FOUP during the movement of the support part, the lift stage 35 moves in a direction opposite to a movement direction of the support part in contact with the FOUP, and the lift stage 35 can follow the FOUP.

This enables horizontal movement of the lift stage 35 in the position where the support part supports the FOUP. Further, by determining the shapes and dimensions of the guide part and the guided part to prevent the horizontal movement in the other portions, the same effects as those of the first to fourth examples can be obtained.

This disclosure can be broadly applied to a transport system including a transport device that lifts and lowers a support part that supports an article to and from an overhead travelling part.

What is claimed is:

1. A transport system comprising:
   an overhead travelling vehicle that transfers an article to and from a placement part on which the article is placed,
   wherein
   the overhead travelling vehicle includes
      a lift stage that is upwardly and downwardly movable,
      support parts provided on the lift stage that support a held part of the article from a lower side, and
      a guided part provided on the lift stage,
   the placement part is provided with a guide part that determines a planar position of the guided part,
   the guide part has a lower portion that ensures, between the lower portion and the guided part, a first gap where the guided part is adapted to move horizontally so that the lift stage follows the article on the placement part, and an upper portion that ensures a second gap between the upper portion and the guided part to restrict horizontal movement of the guided part to prevent swinging of the lift stage,
   the guided part is a vertically penetrating hole,
   the guide part is a rod-shaped member extending vertically and passing through the hole to guide the guided part,
   the upper portion is larger in an outer shape than the lower portion, and the lower portion is disposed inside the upper portion in a plan view,
   a minimum diameter of the guided part is larger than the diameter of a cylindrical portion of the upper portion in plan view,
   at least a portion of the guide part has a tapered shape,
   each of the support parts has a vertical portion and a horizontal portion connecting to a lower end of the vertical portion, and
   a controller that controls upward movement of the lift stage after controlling movement of the support parts away from each other.

2. The transport system according to claim 1, wherein the upper portion and the lower portion are circular and arranged concentrically in a plan view.

3. The transport system according to claim 1, further comprising:
   an inner member and an outer member provided on at least one of the upper portion and the guided part; and
   a first urging member provided between the inner member and the outer member that is adapted to urge the outer member to a first predetermined position by an elastic force responsive to a positional shift amount of the outer member with respect to the inner member.

4. The transport system according to claim 1, further comprising:
   further urging member provided between the placement part and the guide part that is adapted to urge the guide part to a further predetermined position by an elastic force responsive to a positional shift amount of the guide part.

* * * * *